B. Corser,
Clapboard Machine.
Nº 6,033.             Patented Jan. 16, 1849.
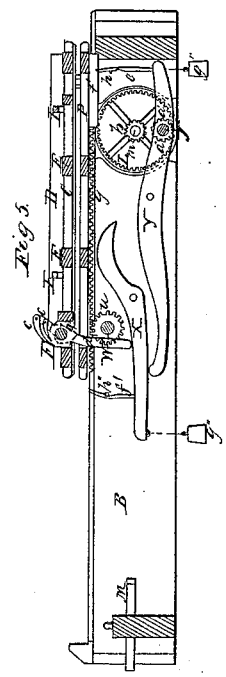
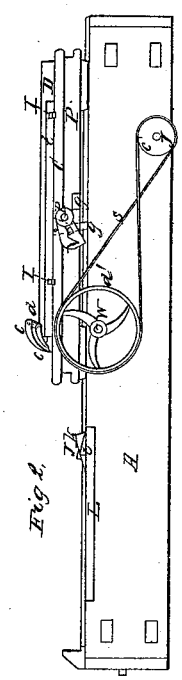
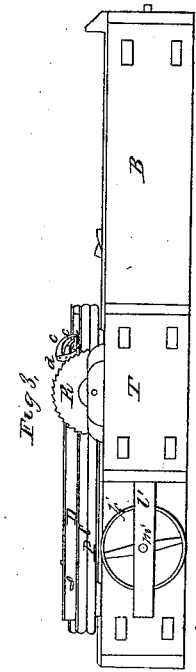
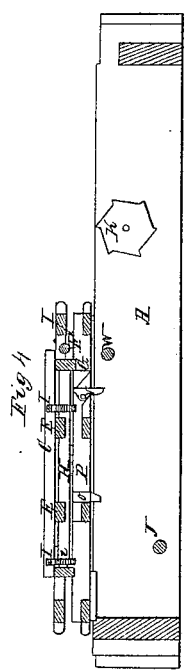
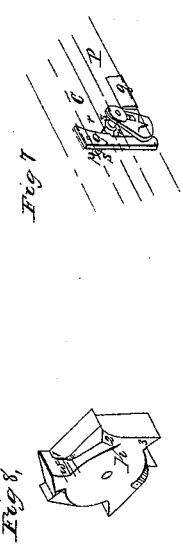
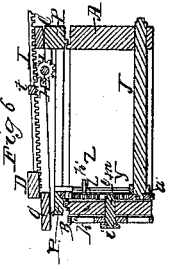
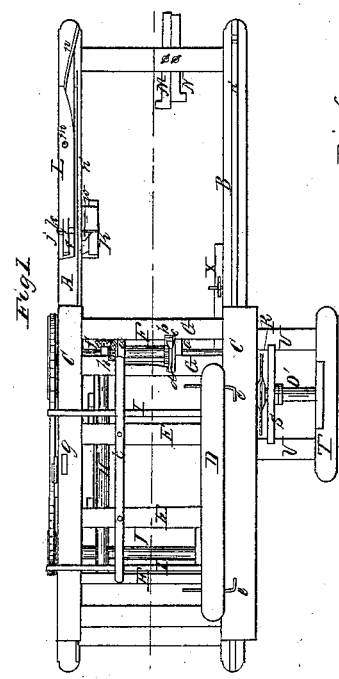

UNITED STATES PATENT OFFICE.

BLISS CORSER, OF MOUNT MORRIS, NEW YORK.

CLAPBOARD-MACHINE.

Specification of Letters Patent No. 6,033, dated January 16, 1849.

*To all whom it may concern:*

Be it known that I, BLISS CORSER, of Mount Morris, in the county of Livingston and State of New York, have invented a new and Improved Machine for Sawing Clapboards; and I do hereby declare the following to be a full, clear, and exact description thereof, reference being had to the accompanying drawings, making a part of this specification, in which—

Figure 1, is a top view, Figs. 2, and 3, side elevations, Figs. 4 and 5, vertical longitudinal sections, Fig. 6, a transverse section, and Figs. 7 and 8, are perspective views of detached portions of the machine.

Similar letters indicate like parts in all the figures.

The nature of my invention consists in so constructing the carriage and combining it with other parts of the machine, that when the thick plank,—or piece of timber of suitable thickness,—is placed upon the carriage and the machine put in motion, it will automatically operate as follows: The portion of the carriage upon which the timber rests will have its side most distant from the saw, alternately elevated and depressed, so as to incline the front edge of the timber, in combination with the feed movement, in such a manner that the saw will cut from the timber—at each forward movement of the carriage—clap-boards, double the thickness at one edge that they are at the other; their thick and thin edges regularly alternating from the top to the bottom of the piece of timber.

The carriage is in two parts united to each other by hinges. The lower portion of the carriage consists of the side pieces P, P, connected by suitable transverse pieces, and resting in guiding grooves upon the ways or rails $n'$, $n'$, on the beams A, B, forming the sides of the frame of the machine. The upper or adjustable portion of the carriage on which the timber is placed for sawing, is composed of the side pieces C, C, united by the transverse pieces E, E, E, G, G, &c., as shown in Fig. 1.

The side piece C, nearest the saw R, is hinged to the side piece P, of the lower portion of the carriage, and projects over the same—extending nearly to the saw as shown in Figs. 1, and 6. D, is a head block resting upon the transverse pieces E, E, E, to which the piece of timber to be converted into clap-boards is secured by means of the usual adjustable dogs $e$, $e$. The piece of timber rests upon the transverse pieces E, E, E, and the side piece C, of the adjustable portion of the carriage, and is fed up to the saw as follows: Racks I, I, are secured to, and project from the rear side of the head block, resting upon and meshing into the pinions $i$, (Fig. 6,) on the shaft H; the shaft H works in bearings secured to the under side of the transverse pieces of the adjustable portion of the carriage, and has a bevel pinion $f$, on its rear end meshing into a bevel pinion $h$, on the extremity of the transverse shaft F,—which works in bearings secured to the short pieces $a$, $a$, connecting the transverse pieces G, G,—(Fig. 1.)

The shaft F, has a ratchet wheel $b$ (Figs. 1, and 5,) secured upon it, operated by the pawls $c$, $c$, upon the upper portion of the vibrating lever $d$, as follows: When the carriage is run back, after sawing a clapboard, the lower end of the lever ($d$,) strikes against one or the other of the adjustable studs M, N, projecting inward through the rear end of the machine, by which blow the lever is vibrated and imparts motion to the ratchet wheel $b$, and shaft F, and thereby to the shaft H, and racks I, I, of the head block D. The lever $d$, is supported by, and works loosely upon the shaft F, by the side of the ratchet wheel $b$, and is thrown back into a position to be operated again—after it has been acted upon—by a spring connected to it in any convenient manner.

An adjustable supporter or leg $g$, is made fast in the center of the outer side piece C, of the adjustable portion of the carriage, which descends through a mortise in the side piece P, of the lower portion of the carriage, and to a suitable distance below the same. An axle $p$, (Fig. 7) is secured by the staples $s$, $s$, in bearings on the upper side of P, by the side of the supporter $g$, having a tooth $r$, projecting from its rear side which fits into a notch on the front side of $g$, when it is elevated, and retains it and the outer edge of the upper portion of the carriage in an elevated position, during every other forward movement of the carriage, as hereinafter set forth. V, is a balance lever, secured by a slot and nut to the outer end of $p$, serving to throw the tooth $r$ into the notch in $g$, when it is elevated, and by striking against the projection $q$, on the side of the lower portion of the carriage, serves to prevent the axle $p$, from turning;

and thereby enables the tooth r, to support the weight of the outer side of the adjustable portion of the carriage and the timber upon the same.

L, is a lever let into a recess in the outer side of the side A, of the machine, near its rear end, and flush with its upper surface; m, is a fulcrum screw or pin passing through L, into A; the inner side of the rear end of L, is beveled off to allow its front end to be vibrated outward; a spring n, presses against the inner side of the rear end of L, pressing inward its front end, as shown in Fig. 1. The lever L, has three inclined planes j, k, l, rising from its front end, (Figs. 1 and 2,) by the side of each other; the central plane k, inclines to the rear, and the two planes j, l, on each side of k, incline forward. A tooth w, projects from the inner side of the front end of L, through an aperture in A, having an acute angled point as shown in Fig. 1. A ratchet wheel K, of the form represented in Fig. 8, is secured by its axle to the inner side (A,) of the machine, opposite the front end of L, in the position represented in Figs. 1, and 4. The wheel K, has six planes formed on its periphery, terminating in radial shoulders; every other plane on K, is the full thickness of the wheel; the remaining planes have a recess cut out from their inner sides leaving them two thirds the thickness of the wheel; at 1 (Fig. 8) where the thin planes join the radial shoulders of the thick planes, a recess (corresponding with the shape of the point of the tooth w,) extends in two thirds the thickness of the wheel. The recesses on the inner side of every other plane, or tooth, of the wheel, terminate in the inclined shoulders 2, communicating with the side of the wheel.

Fig. 1, represents the proper position of the ratchet wheel K, and the lever L, previous to starting the machine. The upper portion of the carriage resting upon the lower portion thereof, and the timber to be sawed properly arranged thereon, motion being given to the saw, and therefrom imparted to the carriage in the manner hereinafter to be described; the operation will be as follows: As the carriage advances the lower end of the supporter g, will be carried up the inclined plane k, and will elevate the outer edge of the upper portion of the carriage a sufficient distance to give such an inclination to the front edge of the timber— before the saw commences operating—as will give the proper shape to the clapboard to be sawed at the next forward movement of the carriage. The supporter g, is retained in an elevated position by means of the axle p, and lever V, in the manner before described. o, v, Fig. 4, are pawls descending from the carriage which operate the wheel K, when the carriage is run back after the saw has run through the timber, (the pawl v, is hinged to the carriage in such a manner that as the carriage goes forward, it passes freely over the ratchet wheel K.)

When the carriage is run back, the pawl v, strikes against the elevated point of K, and revolves it so far as to bring the point of the tooth w, nearly to the inclined shoulder 2, (Fig. 8) on the side of the wheel; and at the moment the carriage reaches the rear end of the machine, the pawl o, strikes the topmost point of K, and moves it just far enough to bring the beveled face of the tooth w, against the inclined shoulder 2, on the side of K; by which movement of K, the front end of the lever L, is forced out a distance equal to one third the thickness of K. The lower end of the balance lever V, as the carriage moves back, will glide freely over the inclined plane l, (moving vertically on the end of p, by means of the slot by which it is connected thereto) and drop down to its lowest position again in the rear of l. The carriage just before it arrives at the rear end of the machine, (with the outer edge of the upper portion thereof elevated, as before described,) forces the lower end of the vertical lever d, against the stud M, imparting thereby sufficient motion to it and to shafts F, and H, to move the timber forward on the carriage half an inch; the moment this takes place, the carriage is again carried forward (in a manner hereinafter described) immediately after it commences its forward movement, and before the timber reaches the saw, the balance lever V, strikes against the rear vertical termination of the inclined plane l, and is brought nearly to a horizontal position, thereby turning the axle p, and disengaging the tooth r, from the notch in the supporter g, causes the longer end of g, to rest at that moment upon the top of the inclined plane j; which serves to let the outer edge of the adjustable portion of the carriage gradually down upon the lower portion thereof, as the carriage advances.

The amount of motion given to the outer edge of the adjustable portion of the carriage, is sufficient to throw back the upper corner of the front side of the timber thereon, one fourth of an inch. It will therefore be perceived that, as the timber on the carriage was fed up half an inch in advance of the line of the saw; and its upper front corner thrown back half this distance, the saw will cut a clap-board from the timber—as the carriage goes forward— half an inch in thickness at its lower edge, and a quarter of an inch at its upper edge.

When the carriage is run back a second time, the fall v, strikes against the most elevated point of the ratchet wheel K, and moves it to such a distance as to bring the point of the tooth w, from the shoulder 2, on the side of the wheel (where it was left at the former return movement of the carriage) nearly to 3, (Fig. 8) thereby pushing out the front end of L, a distance equal to two thirds the thickness of K, in which position the lower end of the supporter $g$,—projecting through P,—passes freely within, and unobstructed by the inclined plane $l$. Just before the carriage reaches the rear end of the machine, (with its adjustable portion resting horizontally upon the lower portion thereof,) the lower end of the lever $d$,—being in a vertical position—will strike against the stud N, receiving sufficient motion therefrom to move forward the timber upon the carriage one fourth of an inch; immediately after this takes place, the pawl $o$, strikes against the uppermost point of K, and moves it a sufficient distance to allow the point of the tooth $w$, to spring into the recess 1, Fig. 8, thereby placing the lever L, and inclined planes $j$, $k$, $l$, in the position represented in Fig. 1.

As the carriage advances again the outer edge of the adjustable portion thereof will be elevated, in the manner before described, a distance sufficient to throw forward the upper corner of the front side of the timber on the carriage, one fourth of an inch. It will therefore be perceived, that as the timber was fed up beyond the line of the saw one fourth of an inch, and its upper front corner thrown forward the same distance in addition—by elevating the outer edge of the upper portion of the carriage,—a clap-board half an inch in thickness at its upper edge, and a quarter of an inch at its lower edge will be sawed from the timber at this forward movement of the carriage. In this manner the operation is continued.

I have described the usual form and thickness of clap-boards; it will however be readily seen, that by adjusting the position of the studs M and N, and varying the length of the supporting leg $g$ and the height of the inclined planes to correspond therewith, that clap-boards or strips of any desired shape may be sawed in my machine. By forcing out the front end of L, and confining it in a sufficiently extended position, clap-boards of uniform thickness from edge to edge may be sawed with my machine.

I will now proceed to describe the manner in which the carriage is automatically moved forward and back upon the machine. The saw shaft O′, is placed in suitable bearings in the side portion U, U, T, of the framework of the machine, projecting from the side beam B. Motion is communicated from the saw shaft by means of suitable bands and pulleys, to the short axle $m'$, passing through the side B, of the machine, and having its outer journal supported by the bearing $l'$, Fig. 3, made fast to B. On the inner side of B, there is a recess formed for the reception of the toothed wheel Z, on the inner end of the axle $m'$, Fig. 5; the teeth of $m'$, are formed on the inner periphery of its rim; a small pinion $b'$, is also placed on the inner end of $m'$, the front side of which is on a line with front side of Z. A shaft J, passes transversely through the machine, having the journal on its inner end supported in the vibrating lever Y, and its outer end in the side A, of the machine. A pinion $a'$, is secured to the inner end of J, located between the teeth of $b'$, and Z, so that by vibrating Y, the pinion $a'$, may be thrown into gear either with one or the other at pleasure, causing the shaft J, to revolve slow in one direction, and fast in the opposite.

W, is a shaft passing transversely through the machine, a short distance below the carriage, supported in apertures in A, and B, a pinion $u$ (Fig. 5) on W, meshes into the rack $z$, on the under side of the carriage, and communicates motion thereto.

The lever Y, is secured by a fulcrum pin to the inner side of B; at the front end of Y, there rises an elastic rod $e'$, having a notch on its rear side, which catches the pin $h'$, projecting from B, when the front end of the lever is elevated, by which the pinion $a'$, on J, is retained in gear with the driving pinion $b'$, on $m'$, while the carriage is carried forward thereby; $g'$, is a weight connected by a cord to the front end of Y, which retains the pinion $a'$, in gear with the toothed wheel Z, while it is imparting a reverse movement to the carriage. X, is a vibrating curved lever secured by a fulcrum pin to the inner side of B, in the position represented in Fig. 5; $f'$, is an elastic rod rising from the rear end of X, having a notch on its front side which is caught by the pin $h''$, when the front end of the lever is elevated, and retains it in the position represented in Fig. 5, till it is detached therefrom.

When the carriage is at the rear end of the machine in a proper position for starting, the rear ends of the levers X and Y, are both depressed by the weight $g''$, suspended to the rear end of X, and the front end of Y, is retained by the elastic rod $e'$, and pin $h'$ in an elevated position, with the pinion $a'$, on J, in gear with the driving pinion $b'$, on the axle $m'$. By this arrangement of parts it will be seen that the saw shaft will communicate a forward movement to the carriage through the medium of the axle $m'$, driving pinion $b'$, pinion $a'$, on the shaft J, the shaft W, connected to J, by the band $s'$, and the pinion $u$, on W, meshing into the rack $z$, on the under side of the carriage. As the carriage advances, the block $t'$, Fig. 5) secured to and projecting from the under side of the carriage, immediately in front of the rack $z$, will strike against the elevated curved portion of the lever X, and press it down a distance sufficient to elevate its front end to such a height that it will be caught and retained by the elastic notched rod $f'$, and the pin $h''$, as before described.

When the carriage reaches the forward end of the machine, the front end of $t$, will strike against the rod $e'$, and detach it from the pin $h'$, when the weight $g'$, will draw down the front end of Y, and throw the pinion $a'$, on J, into gear with Z, which will instantly impart a rapid reverse movement to the carriage. At the moment the carriage reaches its starting position, the front end of $t$, strikes against the rod $f'$, and detaches it from the pin $h''$, allowing the weight $g''$ to vibrate both the levers X, and Y, depressing their rear ends, and throwing the pinion $a'$, again into gear with the driving pinion $b'$, which will instantly reverse the movement of the carriage and carry it forward again. In this manner the carriage is operated back and forth, in combination with the saw, and the movements before described for vibrating the adjustable portion of the carriage, and imparting the feed motion to the head block, until the thick plank, or piece of timber placed upon the carriage, is converted into clap-boards.

Having thus fully described my improved clap-board machine, what I claim therein as new and desire to secure by Letters Patent, is—

1. The combination of the several parts thereof, in such manner that it will automatically saw clap-boards of the shape herein described, viz., the vibrating frame or adjustable portion of the carriage, hinged to the lower portion, the head block D, the racks I, I, (projecting from D,) the shaft H, with the pinions $i$, meshing into racks I, I; the shaft F, geared to H; the ratchet wheel $b$, and vibrating lever $d$, connected to shaft F, the pawls $c, c$, on the upper end of $d$, playing into the ratchet wheel $b$; the studs M, N, projecting from the rear end of the machine; the leg or supporter $g$; (descending from the adjustable portion of the carriage;) the inclined planes $j, k, l$, rising from the front end of the vibrating lever L; the tooth $w$, projecting from the inner side of L; the ratchet wheel K, secured to the side of the machine; the pawls $o, v$, (descending from the carriage;) the axle $p$, with the tooth $r$, and balance lever V; the vibrating levers X, and Y; the axle $m'$, the toothed wheel Z, and pinion $b'$, on $m'$; the pinion $a'$, on the shaft J; the pinion $u$, on the shaft W, meshing into the rack $z$, on the under side of the carriage; the elastic notched rod $e'$, rising from the front end of lever Y, the retaining pin $h'$, projecting from the side of the machine; the weight $g'$, suspended to the front end of lever Y; the elastic notched rod $f'$, rising from the rear end of lever X; the retaining pin $h''$, projecting from the side of the machine; the weight $g''$, suspended to the rear end of lever X, and the block $t'$, projecting from the under side of the carriage; the above enumerated parts, or their equivalents, I claim the arrangement and operation of substantially as herein set forth.

2. I also claim the particular combination of the inclined planes $j, k, l$, rising from the front end of the vibrating lever L; the tooth $w$, projecting from the inner side thereof; the ratchet wheel K; the leg or supporter $g$; (descending from the adjustable portion of the carriage;) the axle $p$, with its retaining tooth $r$, and balance lever V; the pawls $o, v$, descending from the carriage; and the projection $q$ from its side, arranged and operating substantially as herein set forth, for the purpose of producing a regular alternating up and down movement of the outer edge of the adjustable or vibrating portion of the carriage.

3. I also claim in combination with the respective parts for vibrating the upper portion of the carriage, the studs M, and N, the vibrating lever $d$, the pawls $c, c$, the ratchet wheel $b$, the shafts F, and H, and the racks I, I, (connected to the head block D,) for the purpose of imparting the proper feed motion to the timber placed upon the vibrating portion of the carriage, substantially in the manner herein set forth.

4. I also claim the combination of the toothed wheel Z, having internal teeth—and the pinion $b'$, on the same axle, with the pinion $a'$, on the vibrating end of the shaft J, and the weighted levers and spring catches, for the purpose of communicating a slow forward movement to the carriage and a rapid backward movement thereto, substantially in the manner herein represented and described.

By the foregoing claims I do not intend to limit myself to the exact form, number, and arrangement of parts as herein described and represented, but shall vary them as I may deem expedient while I attain the same end by means substantially the same.

The above signed in Washington D. C., March 8th 1848 in presence of two witnesses.

BLISS CORSER.

Witnesses:
Z. C. ROBBINS,
J. EDMUND MILLARD.